US008818456B2

(12) United States Patent
Adamietz (10) Patent No.: US 8,818,456 B2
(45) Date of Patent: Aug. 26, 2014

(54) TIME SHARING SUBSCRIBER IDENTITY MODULES

(75) Inventor: Ansgar Adamietz, Ulm (DE)

(73) Assignee: Nokia Corporation, Espoo (FI)

( * ) Notice: Subject to any disclaimer, the term of this patent is extended or adjusted under 35 U.S.C. 154(b) by 18 days.

(21) Appl. No.: 13/532,666

(22) Filed: Jun. 25, 2012

(65) Prior Publication Data
US 2013/0273971 A1    Oct. 17, 2013

Related U.S. Application Data

(63) Continuation-in-part of application No. 13/447,108, filed on Apr. 13, 2012.

(51) Int. Cl.
*H04B 1/38* (2006.01)
(52) U.S. Cl.
USPC ........................................ 455/558; 455/432.1
(58) Field of Classification Search
USPC .............. 455/415, 418, 432.1, 433, 450, 558; 370/328, 329
See application file for complete search history.

(56) References Cited

U.S. PATENT DOCUMENTS

2013/0210466 A1*  8/2013  Arvidsson et al. ............ 455/458

* cited by examiner

*Primary Examiner* — Sam Bhattacharya
(74) *Attorney, Agent, or Firm* — Mintz, Levin, Cohn, Ferris, Glovsky & Popeo, P.C.

(57) ABSTRACT

Methods and apparatus, including computer program products, are provided for time sharing subscriber identity modules. In some example embodiments, there is provided a method. The method may include detecting, during a first call associated with a first subscriber identity module included in a user equipment, a page representative of a second call associated with a second subscriber identity module; receiving, during the first call associated with the first subscriber identity module included in the user equipment, an indication representative of the second call being detected for the second subscriber identity module; and initiating, based on at least the received indication at the user equipment, the second call by at least switching a subscriber identity module being used by the user equipment from the first subscriber identity module to the second subscriber identity module. Related apparatus, systems, methods, and articles are also described.

19 Claims, 8 Drawing Sheets

```
┌─────────────────────────────────────────┐
│    DETECTING, DURING A FIRST CALL       │
│ ASSOCIATED WITH A FIRST SUBSCRIBER      │
│ IDENTITY MODULE INCLUDED IN A USER      │
│ EQUIPMENT, A PAGE REPRESENTATIVE OF     │── 510
│ A SECOND CALL ASSOCIATED WITH A         │
│ SECOND SUBSCRIBER IDENTITY MODULE       │
│ INCLUDED IN THE USER EQUIPMENT          │
└─────────────────────────────────────────┘
                    │
┌─────────────────────────────────────────┐
│    RECEIVING, DURING THE FIRST CALL     │
│ ASSOCIATED WITH THE FIRST SUBSCRIBER    │
│ IDENTITY MODULE INCLUDED IN A USER      │── 520
│ EQUIPMENT, AN INDICATION REPRESENTATIVE │
│ OF THE SECOND CALL BEING DETECTED FOR   │
│ THE SECOND SUBSCRIBER IDENTITY MODULE   │
└─────────────────────────────────────────┘
                    │
┌─────────────────────────────────────────┐
│    INITIATING, BASED ON AT LEAST THE    │── 530
│ RECEIVED INDICATION AT THE USER         │
│ EQUIPMENT, THE SECOND CALL BY AT LEAST  │
│ SWITCHING A SUBSCRIBER IDENTITY MODULE  │
│ BEING USED BY THE USER EQUIPMENT FROM   │
│ THE FIRST SUBSCRIBER IDENTITY MODULE    │
│ TO THE SECOND SUBSCRIBER IDENTITY       │
│ MODULE                                  │
└─────────────────────────────────────────┘
```

TIME SHARING SUBSCRIBER IDENTITY MODULES

CROSS REFERENCE TO RELATED APPLICATION

This application is a Continuation-In-Part of co-pending U.S. application Ser. No. 13/447,108, filed On Apr. 13, 2012, entitled "Time Sharing Subscriber Identity Modules" the contents of which are hereby incorporated by reference.

FIELD

The subject matter described herein relates to wireless communications.

BACKGROUND

A subscriber identity module (SIM) refers to a circuit that stores an International Mobile Subscriber Identity (IMSI). The SIM may securely store the IMSI and a key used to identify and authenticate a subscriber of a device accessing a mobile network. Typically, the SIM is a card that can be inserted into a device, such as a mobile phone or computer. As such, a device can be configured to operate with any given SIM, and the installed SIM uniquely identifies that that user associated with the SIM is authorized to access the mobile network.

SUMMARY

Methods and apparatus, including computer program products, are provided for configuring a device to operate using two subscriber identity modules.

In some example embodiments, there is provided a method. The method may include detecting, during a first call associated with a first subscriber identity module included in a user equipment, a page representative of a second call associated with a second subscriber identity module; receiving, during the first call associated with the first subscriber identity module included in the user equipment, an indication representative of the second call being detected for the second subscriber identity module; and initiating, based on at least the received indication at the user equipment, the second call by at least switching a subscriber identity module being used by the user equipment from the first subscriber identity module to the second subscriber identity module.

In some example embodiments, one of more variations may be made as well as described in the detailed description below and/or as described in the following features. The detecting may further include switching, at the user equipment, reception from a traffic channel including the first call to a paging channel including the page to enable the detecting, wherein the switching is implemented programmatically under the control of the user equipment. The paging channel may include a physical downlink shared channel including a paging control channel, and the traffic channel may include a physical downlink shared channel. The indication may be generated as an audio indication configured to be played during the first call associated with the first subscriber identity module included in the user equipment. The indication may be generated as a visual indication configured to be presented during the first call associated with the first subscriber identity module included in the user equipment. The first call may be ceased, when the second call is initiated. A second international mobile subscriber identity associated with the second call to the second subscriber identity module included in the user equipment may be detected. The second call may be established based on the detected second international mobile subscriber identity. The detecting may further include pausing the first call to detect the page for the second subscriber identity module.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

Figure 1:
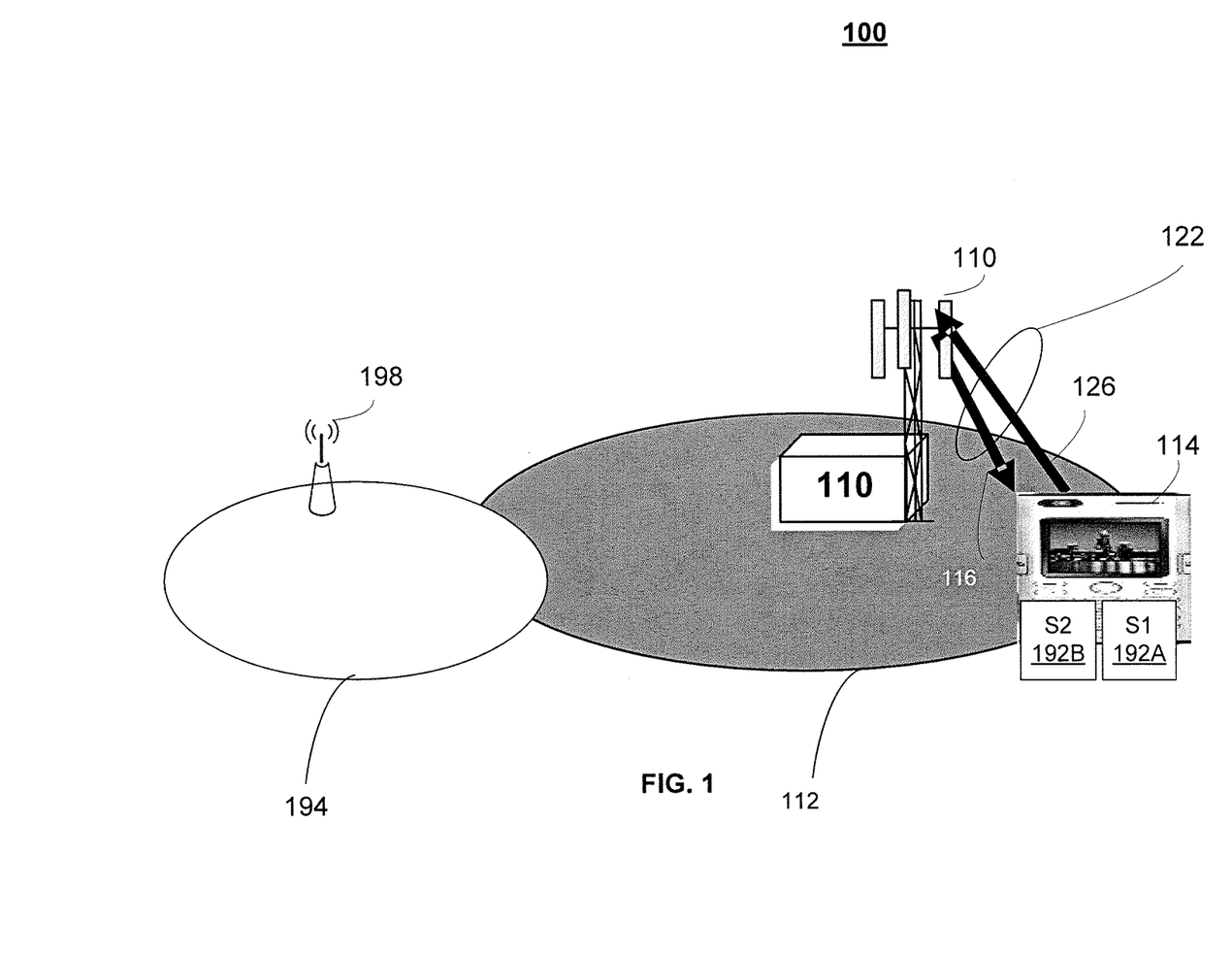
FIG. 1 depicts an example of a system including a user equipment configured to time share between two subscriber identity modules, in accordance with some example embodiments.

FIG. 1 depicts a system 100 including a base station 110 supporting a corresponding coverage area 112 (also referred to as a cell). The base station 110 may be capable of communicating with wireless devices, such as user equipment 114, within its coverage area 112. FIG. 1 also depicts another base station 198 serving another coverage area 194, which may serve user equipment, such as user equipment 114, when it is in the second coverage area 194.

In some example embodiments, the user equipment 114 may be configured with a first subscriber identity module (SIM) 192A and a second SIM 192B. Moreover, a radio of the user equipment 114 may handle a first call with the first SIM 192A, and then momentarily pause the first call and switch the radio to check for a paging signal indicative of a second call for the second SIM 192B.

If a second call is detected for the second SIM 192B, the user equipment 114 may, in some example embodiments, generate an indication, so that a user operating the user equipment 114 is aware of the second call for the second SIM 192B. For example, the user equipment 114 may have a connection via the first call on the first SIM 192A and an indication is generated, such as a display and/or an audio indication, providing an indication that a second call has been detected (e.g., at least a page for the second call). In some example embodiments, the indication may represent that the second call for the second SIM 192B has been detected to allow the user to decide whether to discontinue the first call on the first SIM 192A and establish a call on the second SIM 192B to detect the second call corresponding to the detected page. In some other embodiments, the indication may further include call identification information, such as the phone number of the caller of the second call and/or a call back option.

In some example embodiments, the user equipment 114 may time share its radio section between the two SIMs 192A-B in order to take calls on both SIMs 192A-B, without requiring separate radio sections for each of the SIMs. For example, the user equipment 114 may be configured to switch programmatically, without having to manually remove and swap the SIMs.

Although FIG. 1 depicts two base stations 110 and 198, two cells 112 and 194, and one user equipment 114 including two SIMs, the system 100 may include other quantities of base stations, cells, user equipment, and SIMs as well.

Moreover, the base station, such as base stations 110 and 198, may, in some example embodiments, be implemented as a base station compatible with one or more standards, such as the Global System for Mobile Communications including Universal Mobile Telecommunications System (UMTS), although the base stations may be configured with other standards as well. Moreover, the base stations may be configured in accordance with the same standard or different standards as well. Furthermore, although FIG. 1 depicts an example of a configuration for the base stations, the base stations may be configured in other ways as well. For example, the base stations may include relays, cellular base station transceiver subsystems, gateways, access points, radio frequency (RF) repeaters, frame repeaters, and remote radio heads and include access to other networks as well. For example, base station 110 may have wired and/or wireless backhaul links to other network elements, such as other access points, base stations, remote radio heads, radio network controllers, core networks, serving gateways, mobility management entities, and the like.

In some example embodiments, the system 100 may include access links 122. The access links 122 may include a downlink 116 for transmitting to the user equipment 114 and an uplink 126 for transmitting from user equipment 114 to the base station 110. The downlink 116 may include one or more paging signals, which may include an International Mobile Subscriber Identifier (IMSI), Temporary Mobile Subscriber Identifier (TMSI), and/or other identifiers. The downlink 116 may also include a modulated radio frequency carrying information, such as user data, radio resource control (RRC) messages, location information, and the like, to the user equipment 114, and the uplink 126 may comprise a modulated radio frequency carrying information, such as user data, RRC messages, location information, and the like, from the user equipment 114 to base station 110. The downlink 116 and uplink 126 may, in some example embodiments, each represent a radio frequency (RF) signal. The RF signal may, as noted above, include data, such as voice, video, images, Internet Protocol (IP) packets, control information, and any other type of information and/or messages.

In some example embodiments, the user equipment 114 may be implemented as a mobile device and/or a stationary device. The user equipment may be referred to as, for example, a mobile station, a mobile unit, a subscriber station, a wireless terminal, a tablet, a smart phone, a laptop, a computer, or the like. A user equipment may be implemented as, for example, a wireless handheld device, and/or a wireless plug-in accessory which inserts into another device (e.g., a computer, a tablet, or the like). In some cases, the user equipment may include a processor, a computer-readable storage medium (e.g., memory, storage, and the like), a radio, and/or a user interface. In some example embodiments, the user equipment may include two SIMs, and be configured to receive calls on both of the SIMs based on time sharing a portion of the radio as disclosed herein.

Figure 2A:
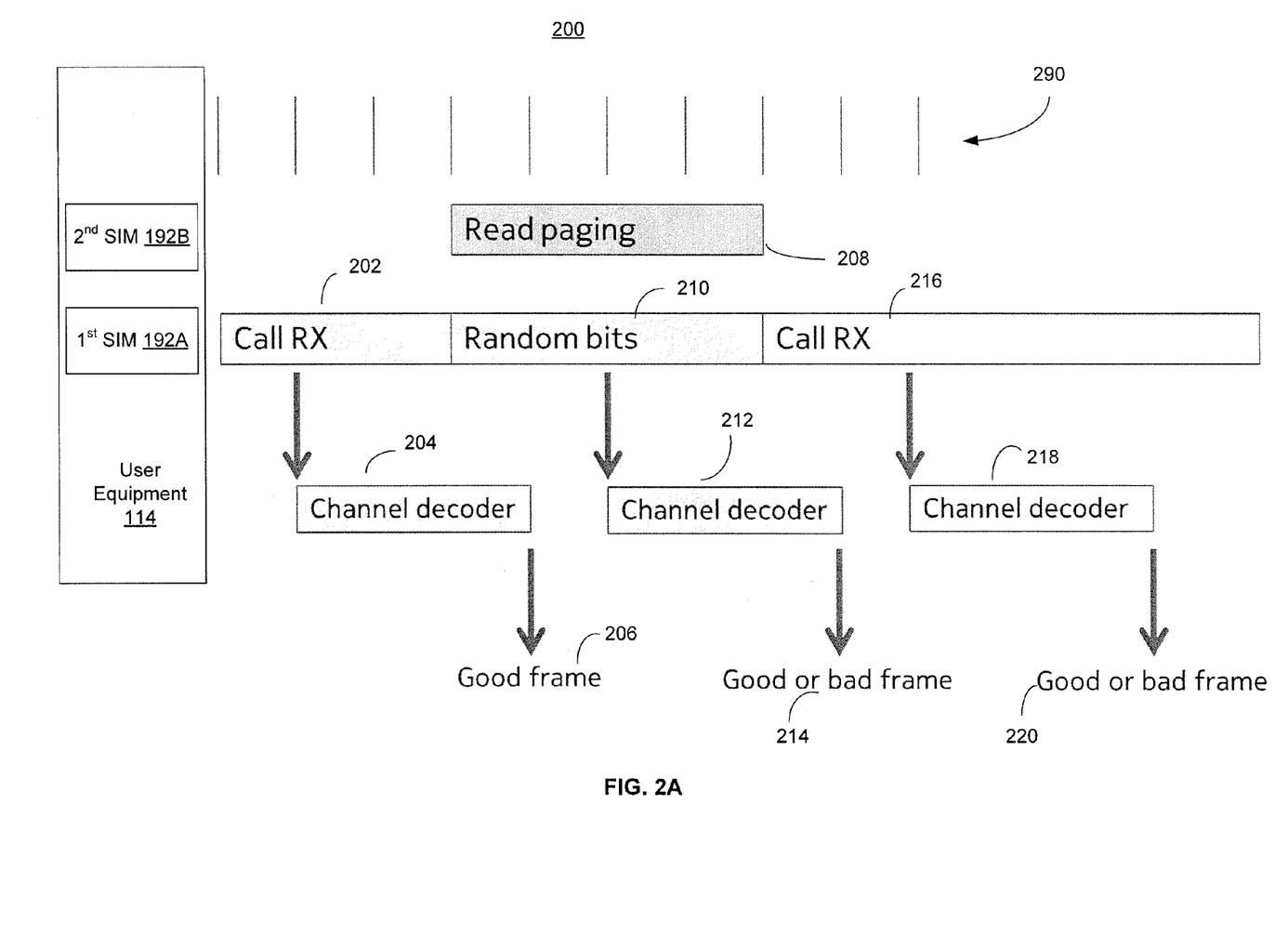
FIG. 2A depicts an example of a process for checking pages for a second call associated with a second SIM, in accordance with some example embodiments.

FIG. 2A depicts a process 200 for detecting pages at a user equipment 114 configured to time share SIMs, such as SIMS 192A-B, in accordance with some example embodiments. At 202-206, the user equipment 114 may receive a first call for an IMSI associated with the first SIM 192A, decode the call using a channel decoder, and obtain decoded frames as indicated by the "good frames." During the first call associated with the first SIM 192A, the user equipment 114 may, at 208, read one or more paging signals 290 sent by the base station 110 to determine whether there is a call for a subscriber identity, such as the IMSI associated with the second SIM 192B, in accordance with some example embodiments. For example, the radio section of the user equipment 114 may momentarily switch (e.g., programmatically switch) to access the page for the second SIM 192B. Because the same radio is used for both SIMs 192A-B, when the user equipment 114 is reading the page at 208, the first call may be interrupted and, as such, there is no activity. During this interruption, the first call for SIM 192A may experience errors. As such, bits, such as random bits 210, and the like, may be inserted into the frame, which when decoded at 212 may correspond to a bad frame at 214. Depending on the reception quality and the specific timing of two received signals, the channel decoder may be able to correct some of the bit errors introduced by the random bits. In the case of a bad frame (in which the channel decoder cannot correct the bit errors), muting algorithms may be implemented in the speech decoder to mask the bad frames from the user. At 216, the user equipment 114 may resume the first call associated with the first SIM 192A, and proceed to decode the first call into frames at 218 and 220.

During 210, no data can be received for the first call associated with the first SIM 192A since the radio of the user equipment 114 is being used to read pages sent by the base station 110. As noted, the channel decoder at 212 may be provided with bits at 210, such as stuff bits, random bits, and the like, causing bad frames at 214, which would be perceived by the user of user equipment 114 as bad data (e.g., unintelligible speech). Although the stuff/random bits at 210 may result in a brief period of bad data (e.g., unintelligible/bade speech frames) at 214, in the case of GSM, about 2 GSM speech frames may have errors within a 0.5 second interval, without substantially impacting the user's quality of experience.

Figure 2B:
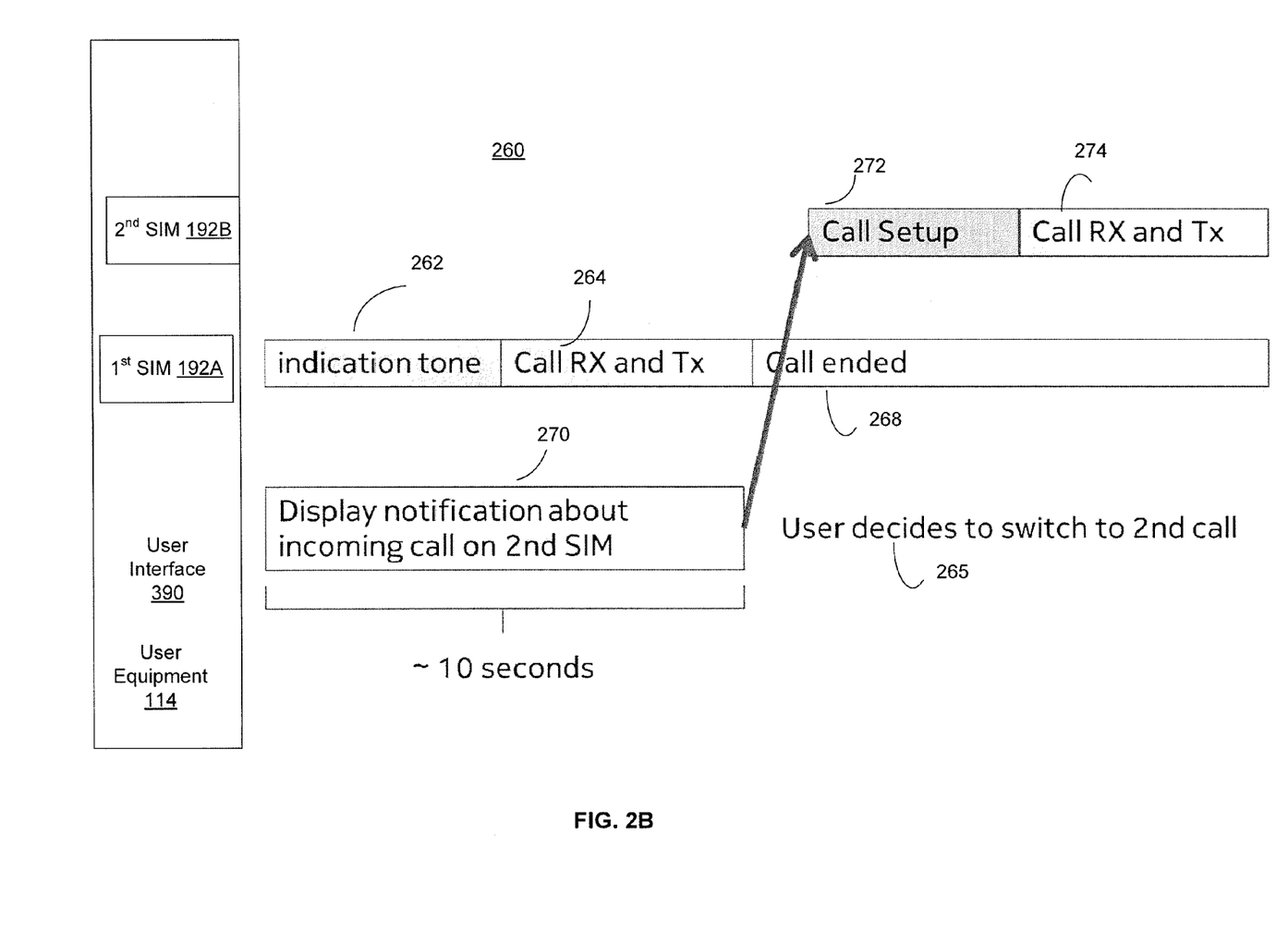
FIG. 2B depicts another example of a process for switching to the second call associated with the second SIM, in accordance with some example embodiments.

FIG. 2B depicts an example process 260 for generating an indication representative of a second call being detected for the second subscriber identity module, in accordance with some example embodiments.

In the example of FIG. 2B, when a page is detected (see, e.g., FIG. 2A at 208) on the second SIM 192B, the user at user equipment 114 may be informed of a second incoming call for the second SIM 192B using one or more indications, such as an audible tone, a vibration, a flashing light, and the like. For example, while the user is conducting a call on the first SIM 192A, the user may receive an indication, such as an audible tone at 262. The indication tone at 262 may represent that a page has been detected for a call for the subscriber identity associated with the second SIM 192B. The indication tone may be implemented as a distinctive tone (e.g., transmitted by a speaker at the user equipment), a message, and the like to indicate that another call is detected on the second SIM 192B. Moreover, an indication may be presented, at 270, at the user interface 390, such as a display, presenting information representative of a second call being detected for the second SIM 192B (e.g., for the subscriber identity associated with the SIM 192B).

In some example embodiments, the indication tone may be played over the communications associated with the call on the first SIM 192A, so that the user can hear the indication tone and the ongoing call, while in some embodiments, the indication tone preempts the communications associated with the call on the first SIM 192A (so the user temporarily hears only the indication tone).

The user may continue to conduct a call on the first SIM 192A as depicted by the call receive (RX) and transmit (TX) at 264. However, if the user decides to take the other call at 265, the call on the first SIM 192A may be ended at 268, and a call set up at 272 would be initiated using the second SIM 192B to establish at 274 the call to answer the page for the second SIM 192B.

In some example embodiments, when a page is detected on the second SIM 192B (e.g., the subscriber identifier associated with the second SIM as described with respect to FIG. 2), the user (or user equipment) typically reacts to the paging within a short timeframe, such as within about 10 seconds, although other time frames may be realized as well. If the user (or user equipment) does not decide to take the call on the second SIM 192B, the paging on the second SIM 192B may be ignored/discontinued and the call on the first SIM shall be continued. In some example embodiments, the page may be detected by configuring the radio portion of the user equipment to momentarily receive the page, rather than the first call (e.g., by switching the radio portion from a traffic channel carrying the first call to a paging channel including the page).

Figure 3:
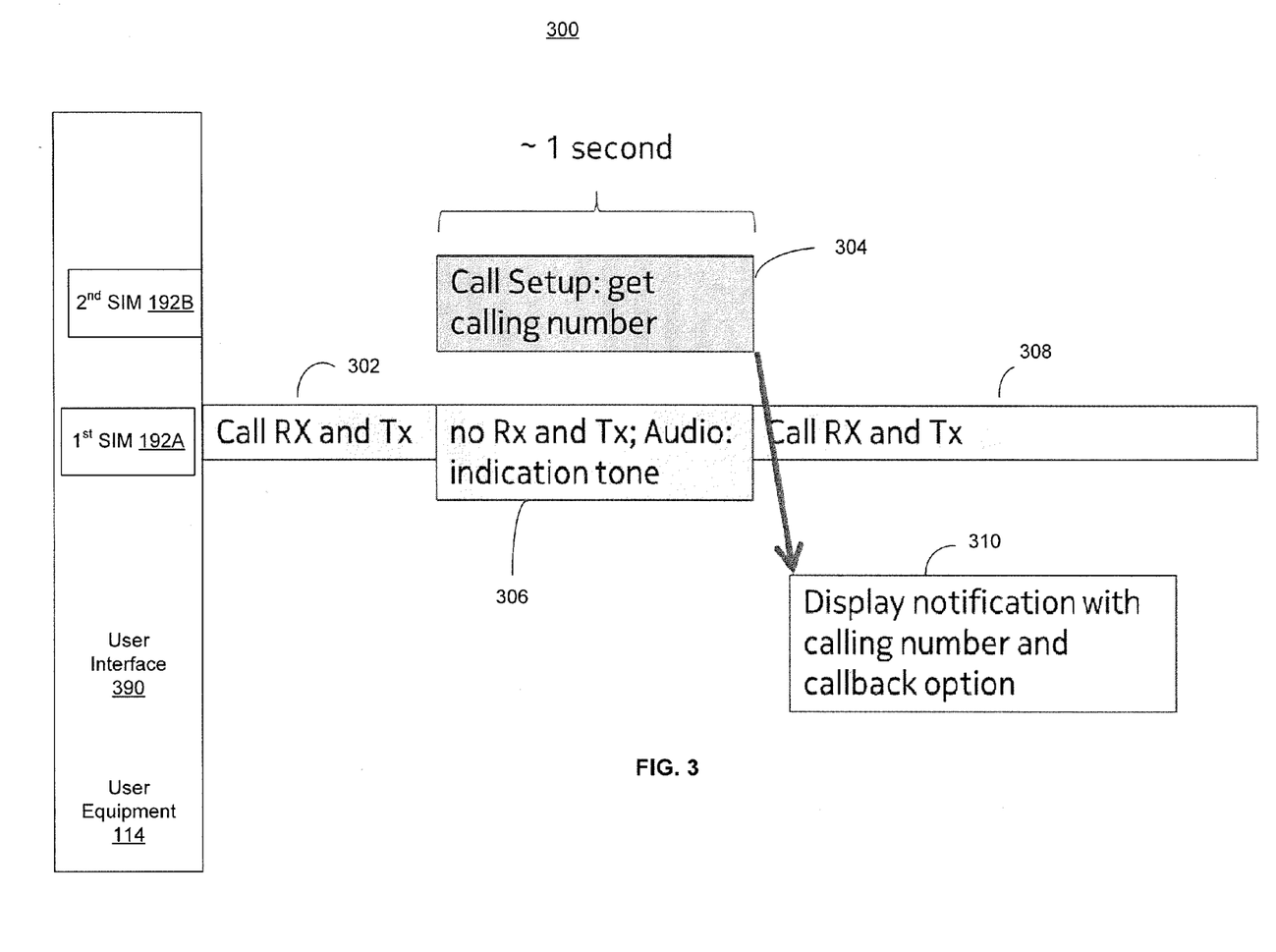
FIG. 3 depicts an example of a process for obtaining caller identification information for the second call associated with the second SIM, in accordance with some example embodiments.

FIG. 3 depicts a process 300 for obtaining the caller identification information, in accordance with some example embodiments. In some instances, the paging may not include any caller number identification, so a call set up must be established to obtain some caller information. At 302, to obtain the caller identification information, user equipment 114 may switch from the first SIM 192A to the second SIM 192B. For example, user equipment 114 may, at 302, momentarily stop communicating on the first call associated with the first SIM 192A and then perform, at 304, a call setup using the second SIM 192B. While the user equipment 114 is establishing a call using the second SIM 192B at 304, the first call 192A may be paused. The paused first call at 306 may not be disconnected due to lack of activity (e.g., the momentary lapse in activity on the first call is akin to going through a "tunnel" or other obstruction that inhibits calling but does not terminate the call). During this pause at 306, the audio for the first call may be muted or a tone may be generated so that the user is informed about the incoming call on the second SIM 192B.

When caller identification information (e.g., caller's phone number and the like) is obtained at 304, the call setup on the second SIM 192B may be ceased, and the user equipment 114 may resume using the first SIM 192 and resume the associated first call as depicted at 308. At 310, the user equipment 114 may generate a notification and present the notification on a user interface (UI) 390 at user equipment 114. The notification may include the caller's phone number and a call back option.

Figure 4:
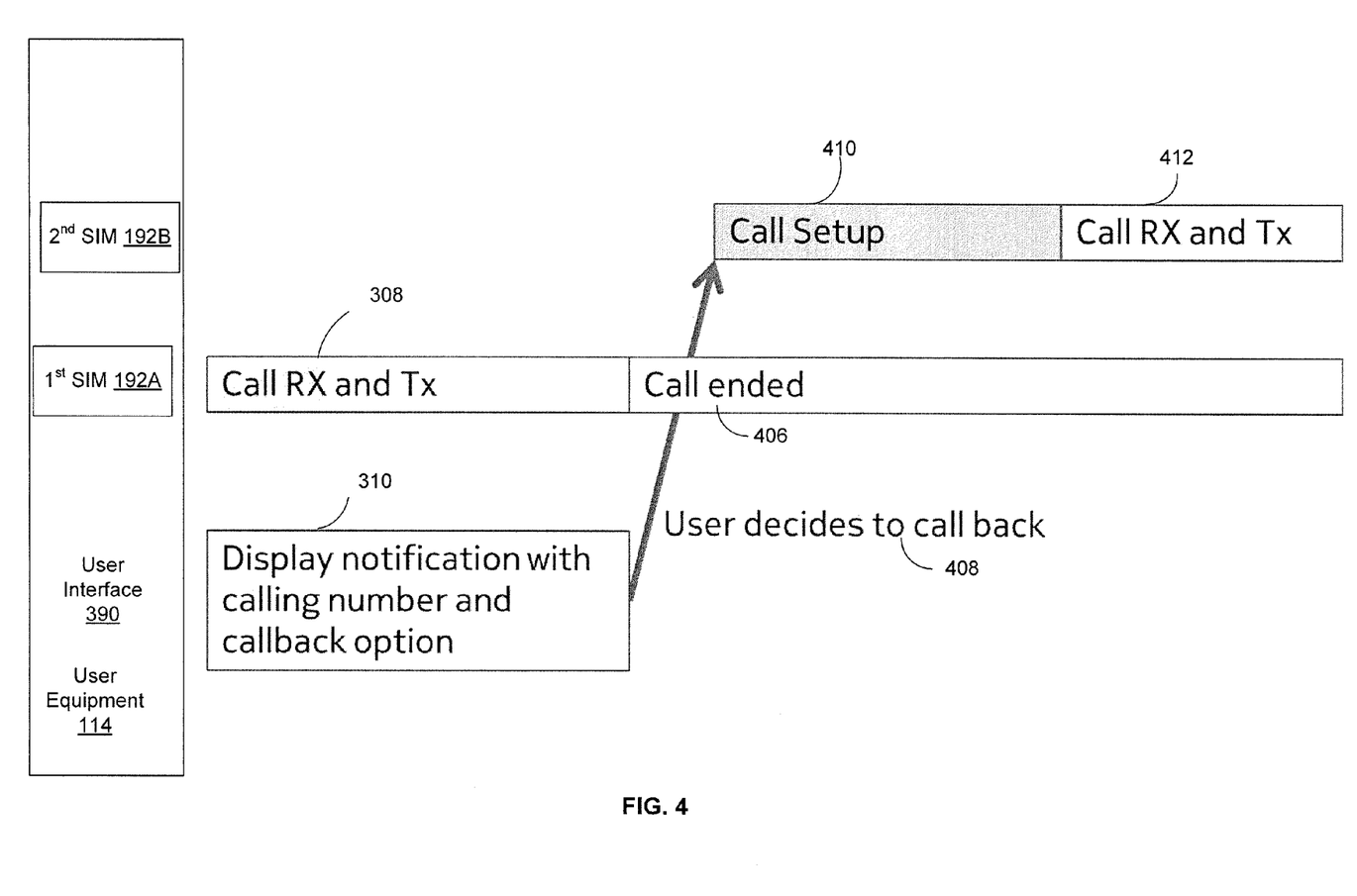
FIG. 4 depicts another example of a process for switching to the second call associated with the second SIM, in accordance with some example embodiments.

FIG. 4 depicts a process 400 that may be implemented at the user equipment 114 when the caller identification information is determined and/or presented at 316, in accordance with some example embodiments.

At 406, the user equipment 114 may end the first call associated with the first SIM 192A. For example, a user may decide to initiate a call back to reach the caller of the second call associated with the second SIM 192B. When this is the case, the user equipment 114 may terminate the first call associated with the first SIM 192A. At 410, the user equipment 114 may switch to using the second SIM 192B and then proceed with the call back, establishing the second call associated with the second SIM 192B, as depicted at 408 and 410. Once the second call is established, the user equipment 114 proceeds with the second call on the second SIM 192B as depicted at 412.

Figure 5:
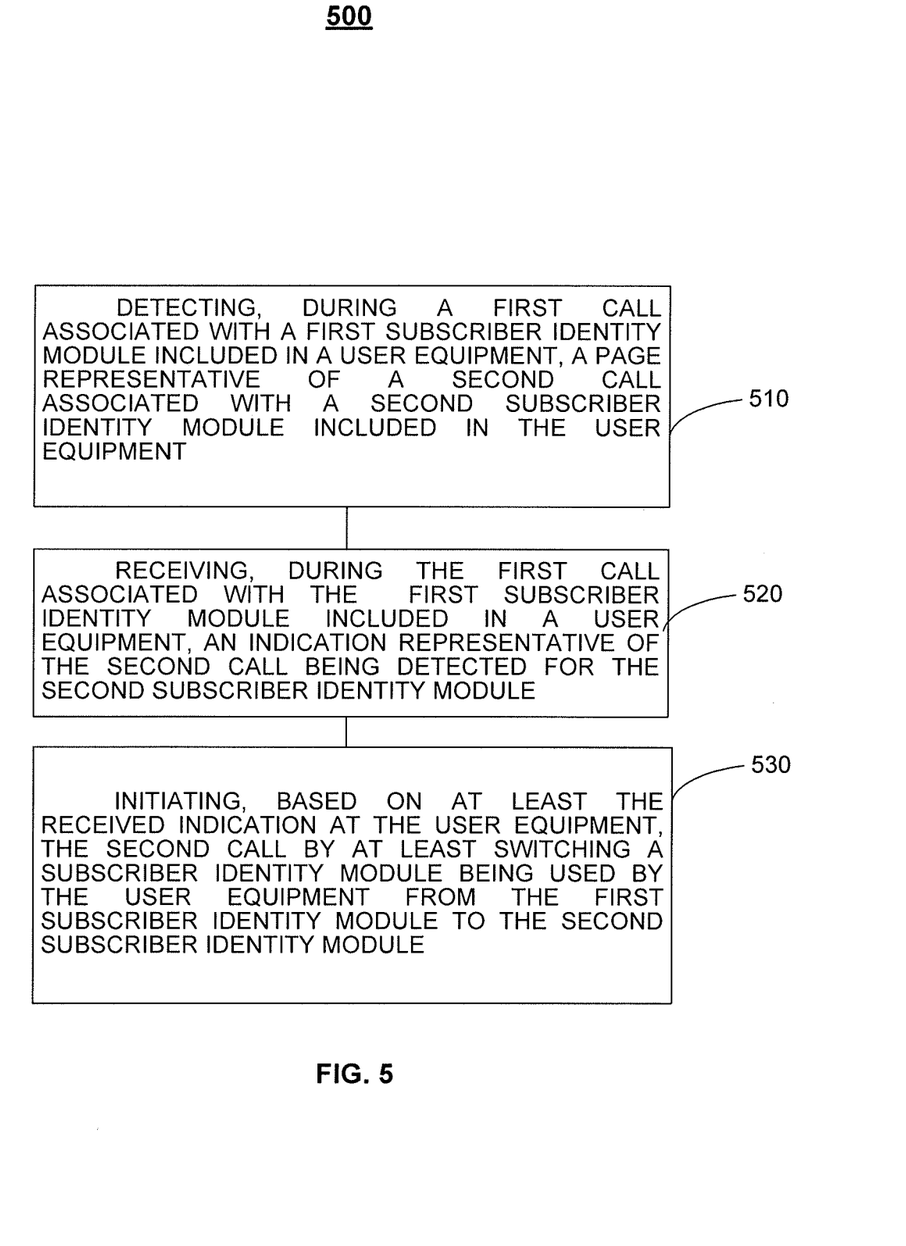
FIG. 5 depicts an example of a process for configuring a user equipment to time share between two subscriber identity modules, in accordance with some example embodiments.

FIG. 5 depicts a process 500 for configuring a device to operate using two SIMs, such as SIMs 192A-B, in accordance with some example embodiments.

At 510, the user equipment 114 may detect, during a first call associated with a first subscriber identity module (SIM), a page representative of a second call associated with a second SIM (e.g., the subscriber identifier associated with the second SIM), in accordance with some example embodiments. For example, base station 110 may transmit one or more pages (which may include an IMSI and/or other like identifiers) to user equipment being served by base station 110. The user equipment 114 may momentarily pause the first call and read one or more paging signals to detect a second call for the second SIM, as describe above at FIG. 2A. 2. The user equipment may detect the page by switching reception at the radio portion from a traffic channel carry the first call to a paging channel carrying the page. The switching may be implemented programmatically under the control of the user equipment, without requiring the user to swap SIMs. Moreover, the switching may be momentary in the sense that the user equipment switches to the paging channel to detect the page and then may return to the traffic channel carrying the first call. And, the user equipment may be configured to switch to the paging channel to check for pages during the first call at one or more times during the first call.

At 520, an indication may be received during the first call associated with the first subscriber identity module 192A included in user equipment 114, in accordance with some example embodiments. The indication may represent a second call being detected for the second subscriber identity module 192A. For example, when the user is conducting a call on the user equipment 114 configured with the first SIM 192A, the user may receive one or more indications. The indication may be generated as an audible tone, a message, a display, a flashing light, a visual display, and the like. For example, the indication may be presented at a user interface 390 of user equipment 114 as textual or graphical information indicating the call for the second SIM 192B. In any case, the indication, such as the indication tone at 262 and/or the display indication at 270, represents that a page has been detected, at 510, and that page represents a call for the second SIM 192B (e.g., the subscriber identity associated with the second SIM).

In some example embodiments, the indication tone may be played over the communications associated with the call on the first SIM 192A, so that the user can hear the indication tone and the ongoing call, while in some embodiments, the indication tone preempts the communications associated with the call on the first SIM 192A (so the user temporarily only hears the indication tone).

At 530, the second call may be initiated based on at least the received indication at the user equipment, in accordance with some example embodiments. For example, the user equipment 114 may switch (e.g., a programmatically configured switch) the subscriber identity module being used by the user equipment from the first subscriber identity module 192A to the second subscriber identity module 192B and then initiate a call set-up on the second SIM 192B and establish the second call, as described above with respect to 272 and 274. The first call on the first SIM 192A may be ended as well.

Figure 6:
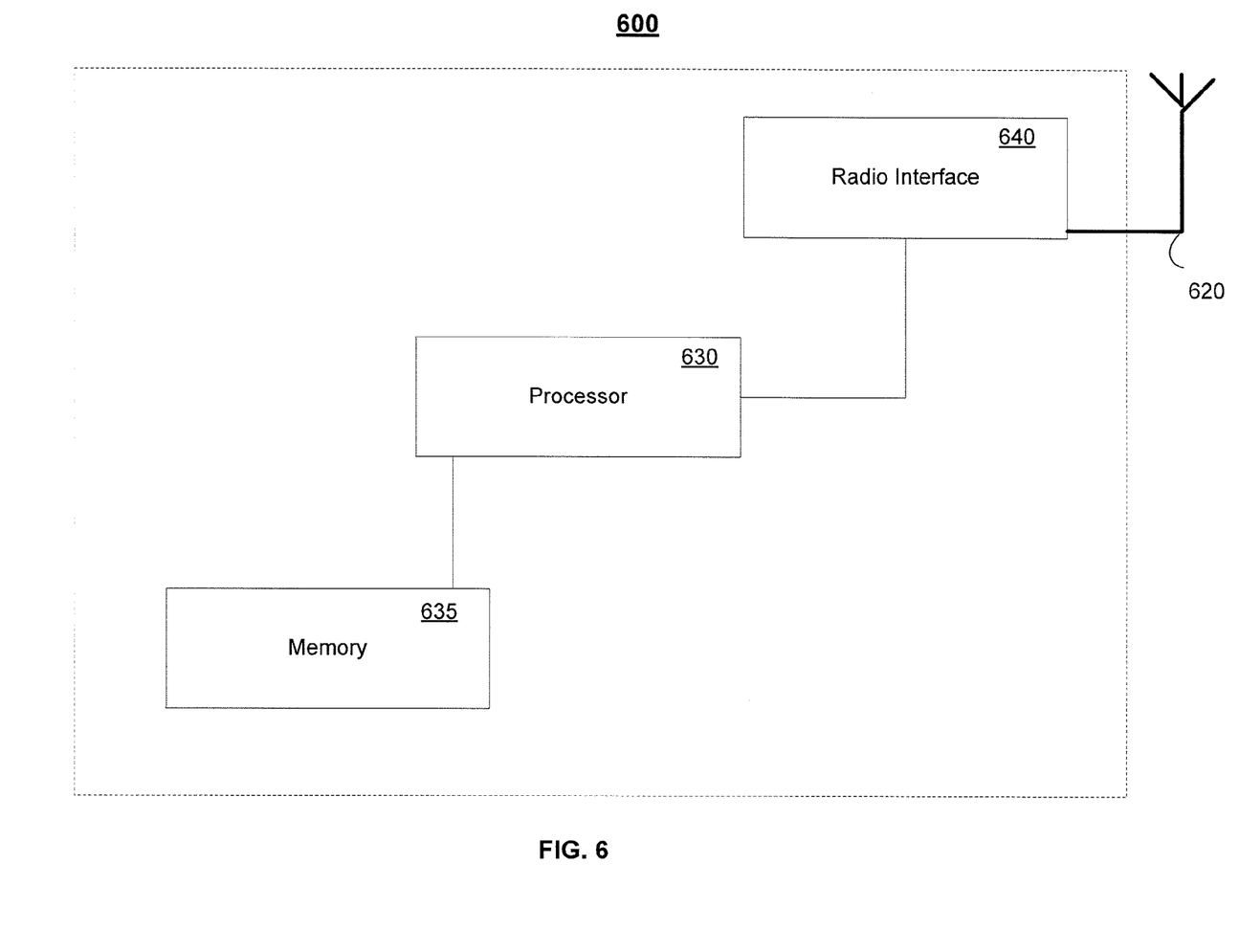
FIG. 6 depicts an example of a base station, in accordance with some example embodiments.

FIG. 6 depicts an example implementation of a base station 600, which may be implemented at base stations 110 and 198. The base station may include one or more antennas 620 configured to transmit via a downlink and configured to receive uplinks via the antenna(s) 620. The base station may further include a radio interface 640 coupled to the antenna 620, a processor 630 for controlling the base station 600 and for accessing and executing program code stored in memory 635. The radio interface 640 may further include other components, such as filters, converters (e.g., digital-to-analog converters and the like), mappers, a Fast Fourier Transform (FFT) module, and the like, to generate pages, symbols, and the like for a transmission via one or more downlinks and to receive symbols (e.g., via an uplink). The base station 600 may perform one or more of the functions described herein with respect to base station 110.

Figure 7:
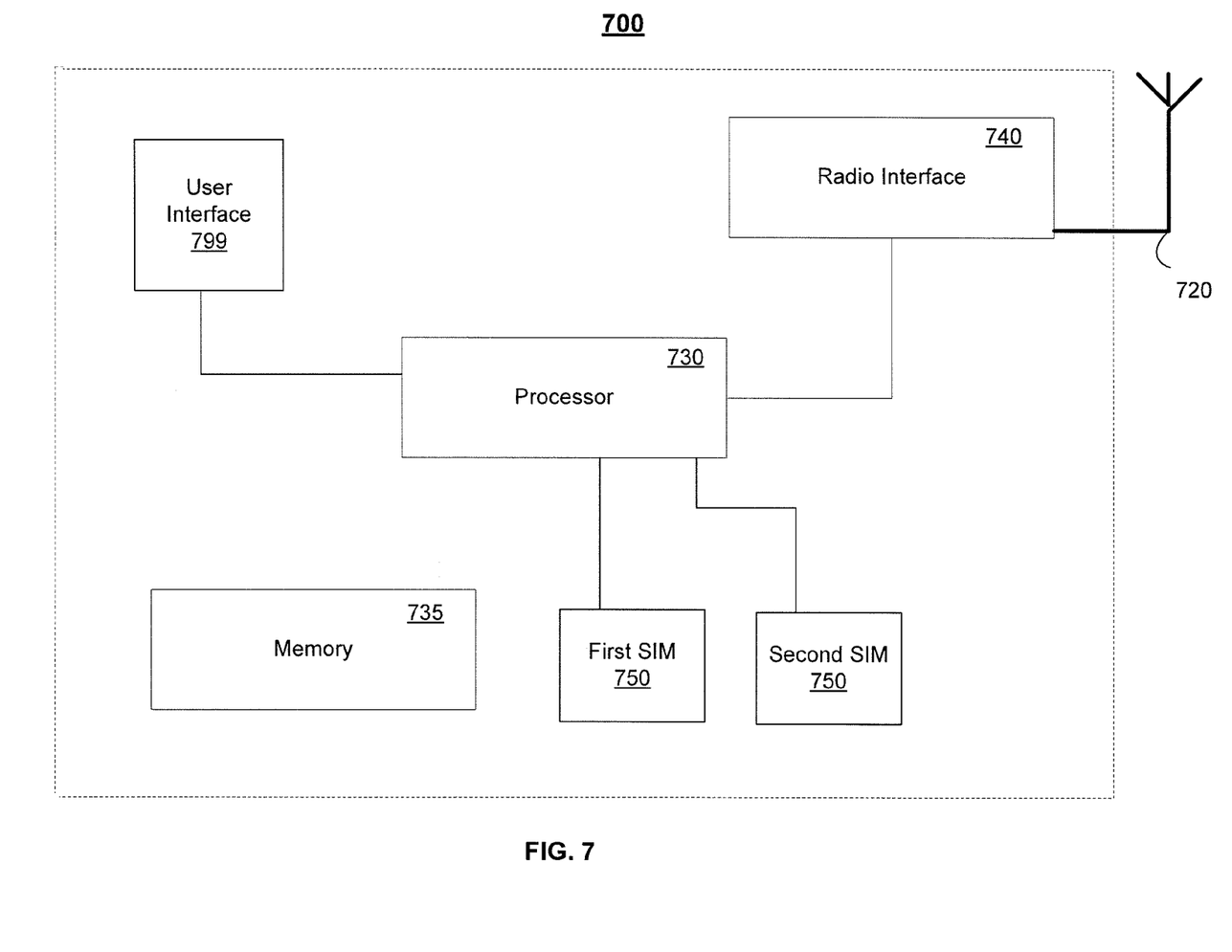
FIG. 7 depicts an example of a user equipment configured to time share between two subscriber identity modules, in accordance with some example embodiments.

FIG. 7 depicts a block diagram of a radio, such as a user equipment 700. User equipment 700 may be implemented to perform one or more of the functions describe herein with respect to the user equipment, such as user equipment 114. The user equipment 700 may include one or more antennas 720 for receiving a downlink including pages and/or traffic from the base station and for transmitting via an uplink. The user equipment 700 may also include a radio interface 740, which may include other components, such as filters, converters (e.g., digital-to-analog converters and the like), symbol demappers, signal shaping components, an Inverse Fast Fourier Transform (IFFT) module, and the like, to process pages, symbols, such as OFDMA symbols, carried by a downlink or an uplink, and the like. In some implementations, the user equipment 700 may also be compatible with WiFi, Bluetooth, GERAN, UTRAN, E-UTRAN, and/or other standards and specifications as well. The user equipment 700 may further include at least one processor, such as processor 730, for controlling user equipment 700 and for accessing and executing program code stored in memory 735. The user equipment may include two SIMs 192A-B, and the processor 730 may configure the user equipment to time share the two SIMs 192A-B by switching between the two SIMs 192A-B, although the user equipment may switch among other quantities of SIMs as well. The user equipment may also include a user interface 390. The user interface 390 may comprise one or more of the following: a keypad, a key board, a screen, a speaker, a microphone, and/or any other mechanism for interfacing a user. For example, the user interface 390 may present to a user an audible tone transmitted by the speaker, a message presented by a display, and the like. The user interface 390 may present an icon to allow an automatic call back to the caller associated with the second SIM.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, although the change in search pattern is described with respect to small cell base station 110B, other types of base stations and access points may change search modes as described herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:

detecting, during a first call associated with a first subscriber identity module included in a user equipment, a page representative of a second call associated with a second subscriber identity module;

receiving, during the first call associated with the first subscriber identity module included in the user equipment, an indication representative of the second call being detected for the second subscriber identity module; and initiating, based on at least the received indication at the user equipment, the second call by at least switching a subscriber identity module being used by the user equipment from the first subscriber identity module to the second subscriber identity module.

2. The method of claim 1, wherein the detecting further comprises:

switching, at the user equipment, reception from a traffic channel including the first call to a paging channel including the page to enable the detecting, wherein the switching is implemented programmatically under the control of the user equipment.

3. The method of claim 1, wherein the paging channel comprises a physical downlink shared channel including a paging control channel, and the traffic channel comprises a physical downlink shared channel.

4. The method of claim 1 further comprising:
generating the indication as an audio indication configured to be played during the first call associated with the first subscriber identity module included in the user equipment.

5. The method of claim 1 further comprising:
generating the indication as a visual indication configured to be presented during the first call associated with the first subscriber identity module included in the user equipment.

6. The method of claim 1 further comprising:
ceasing the first call, when the second call is initiated.

7. The method of claim 1, wherein the detecting further comprises:
detecting a second international mobile subscriber identity associated with the second call to the second subscriber identity module included in the user equipment.

8. The method of claim 1 further comprising:
establishing, based on the detected second international mobile subscriber identity, the second call.

9. The method of claim 1, wherein the detecting further comprises:
pausing the first call to detect the page for the second subscriber identity module.

10. An apparatus comprising:
at least one processor; and
at least one memory including computer program code the at least one memory and the computer program code configured to, with the at least one processor, cause the apparatus to perform at least the following:
detect, during a first call associated with a first subscriber identity module included in the apparatus, a page representative of a second call associated with a second subscriber identity module;
receive, during the first call associated with the first subscriber identity module included in the apparatus, an indication representative of the second call being detected for the second subscriber identity module; and
initiate, based on at least the received indication at the apparatus, the second call by at least switching a subscriber identity module being used by the apparatus from the first subscriber identity module to the second subscriber identity module.

11. The apparatus of claim 10, wherein the apparatus is further configured to at least:
switch, at the apparatus, reception from a traffic channel including the first call to a paging channel including the page to enable the detecting, wherein the switching is implemented programmatically under the control of the apparatus.

12. The apparatus of claim 10, wherein the paging channel comprises a physical downlink shared channel including a paging control channel, and the traffic channel comprises a physical downlink shared channel.

13. The apparatus of claim 10, wherein the apparatus is further configured to at least:
generate the indication as an audio indication configured to be played during the first call associated with the first subscriber identity module included in the apparatus.

14. The apparatus of claim 10, wherein the apparatus is further configured to at least:
generate the indication as a visual indication configured to be presented during the first call associated with the first subscriber identity module included in the apparatus.

15. The apparatus of claim 10, wherein the apparatus is further configured to at least:
cease the first call, when the second call is initiated.

16. The apparatus of claim 10, wherein the apparatus is further configured to at least:
detect a second international mobile subscriber identity associated with the second call to the second subscriber identity module included in the apparatus.

17. The apparatus of claim 10, wherein the apparatus is further configured to at least:
establish, based on the detected second international mobile subscriber identity, the second call.

18. The apparatus of claim 10, wherein the apparatus is further configured to at least:
pause the first call to detect the page for the second subscriber identity module.

19. A non-transitory computer-readable medium including code which when executed by at least one processor provides operations comprising:
detecting, during a first call associated with a first subscriber identity module included in a user equipment, a page representative of a second call associated with a second subscriber identity module;
receiving, during the first call associated with the first subscriber identity module included in the user equipment, an indication representative of the second call being detected for the second subscriber identity module; and
initiating, based on at least the received indication at the user equipment, the second call by at least switching a subscriber identity module being used by the user equipment from the first subscriber identity module to the second subscriber identity module.

* * * * *